(12) United States Patent
Fabbri

(10) Patent No.: US 6,890,129 B2
(45) Date of Patent: May 10, 2005

(54) DRIED PRODUCT DISCHARGE SYSTEM

(75) Inventor: Luigi Fabbri, Brembate di Sopra (IT)

(73) Assignee: 3V Cogeim S.p.A., Milan (IT)

( * ) Notice: Subject to any disclaimer, the term of this patent is extended or adjusted under 35 U.S.C. 154(b) by 0 days.

(21) Appl. No.: 10/171,667

(22) Filed: Jun. 17, 2002

(65) Prior Publication Data

US 2003/0000103 A1 Jan. 2, 2003

(30) Foreign Application Priority Data

Jun. 27, 2001 (IT) .................................... MI2001A1352

(51) Int. Cl.⁷ ............................................. B65G 53/28
(52) U.S. Cl. ...................... 406/106; 406/135; 406/146; 406/151; 406/171; 406/175
(58) Field of Search ................. 406/106, 135, 406/146, 151, 152, 153, 171, 172, 175

(56) References Cited

U.S. PATENT DOCUMENTS

| | | | | |
|---|---|---|---|---|
| 1,365,663 A | * | 1/1921 | Covert | 406/14 |
| 2,276,805 A | * | 3/1942 | Tolman, Jr. | 406/172 |
| 2,814,531 A | * | 11/1957 | Murray, Jr. | 406/106 |
| 3,236,565 A | * | 2/1966 | Kester et al. | 406/173 |
| 3,309,148 A | * | 3/1967 | Wilder | 406/109 |
| 3,654,705 A | * | 4/1972 | Smith et al. | 34/368 |
| 3,694,037 A | * | 9/1972 | Feder | 406/23 |
| 4,005,908 A | * | 2/1977 | Freeman | 406/25 |
| 4,502,820 A | | 3/1985 | Fujii et al. | |
| 4,695,205 A | * | 9/1987 | Levine | 406/38 |
| 5,325,606 A | * | 7/1994 | Liborius | 34/589 |
| 5,564,350 A | | 10/1996 | Peplinski et al. | |
| 5,727,909 A | * | 3/1998 | Laird | 406/106 |
| 5,882,381 A | * | 3/1999 | Hauck et al. | 95/109 |
| 5,947,645 A | * | 9/1999 | Rixom et al. | 406/32 |
| 6,722,822 B2 | * | 4/2004 | Pfeiffer et al. | 406/164 |

FOREIGN PATENT DOCUMENTS

| | | |
|---|---|---|
| DE | 42 16 505 | 11/1993 |
| FR | 2 272 929 | 12/1975 |
| WO | 89 07568 | 8/1989 |

* cited by examiner

*Primary Examiner*—Joe Dillon, Jr.
(74) *Attorney, Agent, or Firm*—Guido Modiano; Albert Josif; Daniel O'Byrne

(57) ABSTRACT

A system for discharging dried product, particularly for drying filters, drying units and the like, comprising, on a container for treating and containing a dried product, a discharge hole that is controlled by a discharge valve, interposed on a pneumatic circuit suitable to produce a circulation of fluid in output from the discharge hole. An agitator is also provided which acts on the dried product to facilitate its outward conveyance.

6 Claims, 3 Drawing Sheets

DRIED PRODUCT DISCHARGE SYSTEM

BACKGROUND OF THE INVENTION

The present invention relates to a system for discharging dried product, particularly for drying filters, drying units and the like.

It is known that drying filters are generally structurally constituted by a container in which a solid portion is separated from a liquid in a closed chamber that can optionally be pressurized; the separated portion is thereafter subjected to streams of hot air and/or to heating from the chamber walls and to stirring from an agitator, so as to eventually dry the product within the same system.

These drying filters have, in their lower part, a discharge hatch that is arranged either laterally or on the bottom thereof, is of the plug or swinging type, and can be opened for discharging the product that has to be transferred externally.

In order to achieve a good seal, discharge hatches are provided with an O-ring seal or a metal-to-metal seal that is particularly critical in operation, especially after discharging a first batch of separated product, since during discharge the hatches become soiled with the product and it is therefore necessary to perform accurate cleaning in order to ensure tightness.

To perform cleaning, it is necessary to resort to particular precautions, such as the use of glove boxes, which are expensive, or of other systems for protecting the operator or the environment, which involve very high costs and increased overall dimensions of the device that are difficult to meet.

Moreover, another problem that can be observed with the discharge systems of the prior art consists in that the hatches that are currently used do not allow to perform a metered discharge, since they simply allow opening or closure, with consequent escape of the product without the possibility to regulate the quantity.

SUMMARY OF THE INVENTION

The aim of the present invention is to solve the above mentioned drawbacks by providing a system for discharging dried product, particularly for drying filters, drying units and the like, that allows to facilitate the external discharge of the product without having to resort to a hatch-type opening, as instead occurs in the prior art, thus simplifying considerably the entire structure of the container and consequently reducing costs.

Within this aim, an object of the invention is to provide a discharge system and method that allow to achieve an optimum product discharging, with the advantage of being able to adjust and meter at will the discharged quantity, since the opening and closure of a hatch is eliminated completely.

Another object of the present invention is to provide a discharge system that simplifies considerably all the cleaning and sealing operations, since the hatch remains completely unused.

Another object of the present invention is to provide a discharge system that thanks to its particular constructive characteristics is capable of giving the greatest assurances of reliability and safety in use.

Another object of the present invention is to provide a system for discharging dried product, particularly for drying filters, drying units and the like, that can be obtained easily starting from commonly commercially available elements and materials and is furthermore competitive from a merely economical standpoint.

This aim and these and other objects that will become better apparent hereinafter are achieved by a system for discharging dried product, particularly for drying filters, drying units and the like, according to the invention, characterized in that it comprises, on a container for treating and containing a dried product, a discharge hole that is controlled by a discharge valve that is interposed on a pneumatic circuit suitable to produce a circulation of fluid in output from said discharge hole, an agitator being further provided which acts on said dried product.

BRIEF DESCRIPTION OF THE DRAWINGS

Further characteristics and advantages will become better apparent from the following detailed description of a preferred but not exclusive embodiment of a system for discharging dried product, particularly for drying filters, drying units and the like, illustrated only by way of non-limitative example with the aid of the accompanying drawing, FIG. 1 a schematic view of a drying filter to which an open loop dried product discharge system according to the invention is applied.

DESCRIPTION OF THE PREFERRED EMBODIMENTS

Figure 1:
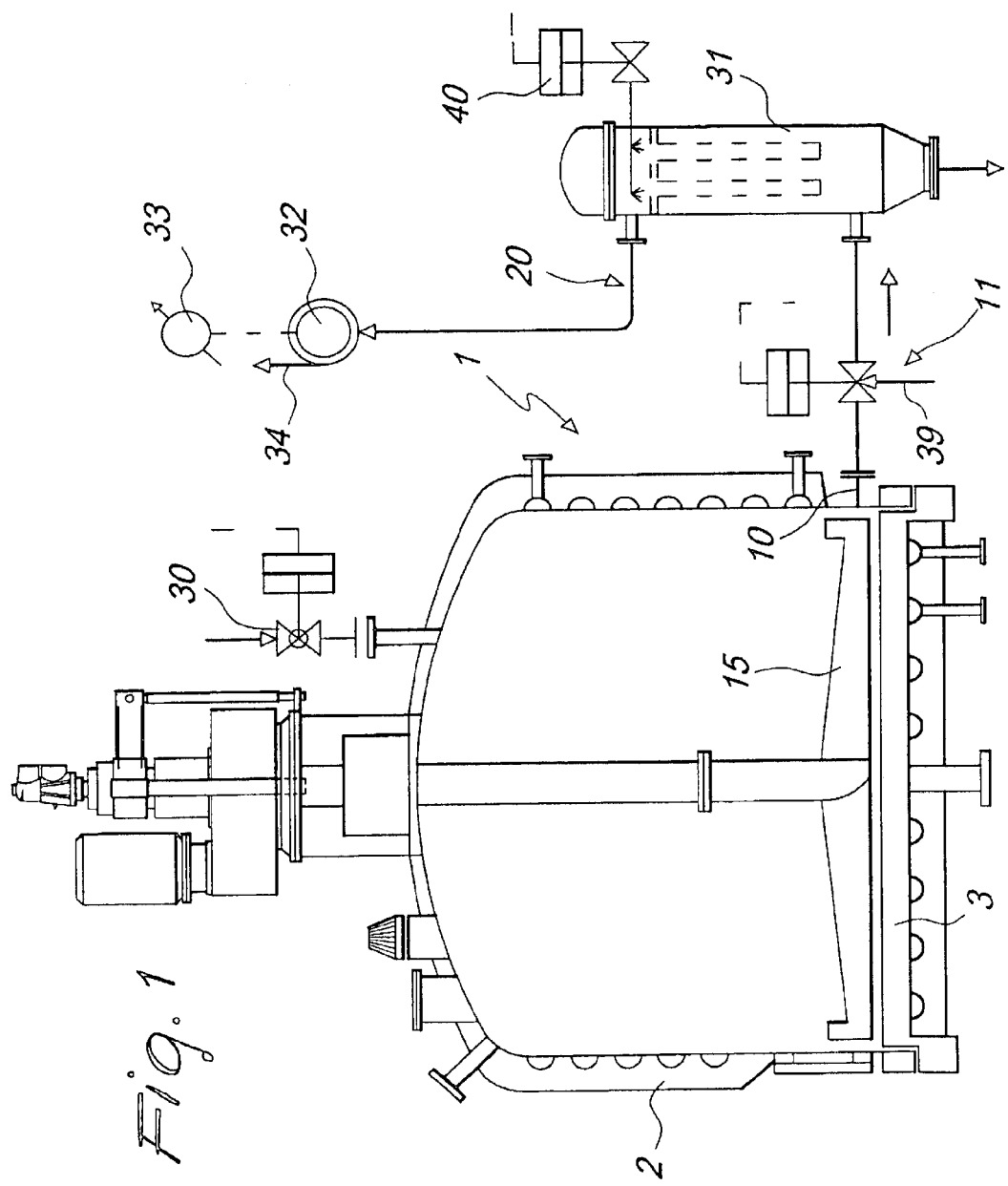

With reference to the figure, a container for treating and containing a dried product is shown and is generally designated by the reference numeral 1; in a per se known manner, the container is formed by an upper body 2 closed by a bottom 3 where the usual filtering mesh 4 is optionally provided.

The particularity of the invention consists in that there is a discharge hole 10 controlled by a discharge valve 11, which is interposed on a pneumatic circuit 20 that produces a circulation of fluid inside the container 1, so as to convey externally the dried product, which is stirred and moved by means of a conventional agitator 15 arranged inside the container.

The discharge hole, as shown in the drawing, is located proximate to the bottom; its location can of course be defined depending on the various operating requirements.

The invention has the aim of avoiding the use of the conventional hatch, which might be provided but not used, in the case of a container that is already commercially available, so as to be able to extract the dried product, generally in powder form, without encountering the kinds of problem that are typical of these devices.

In particular, a pneumatic conveyance is achieved which can be provided in various manners, with suction, pressure, or both.

Figure 2:
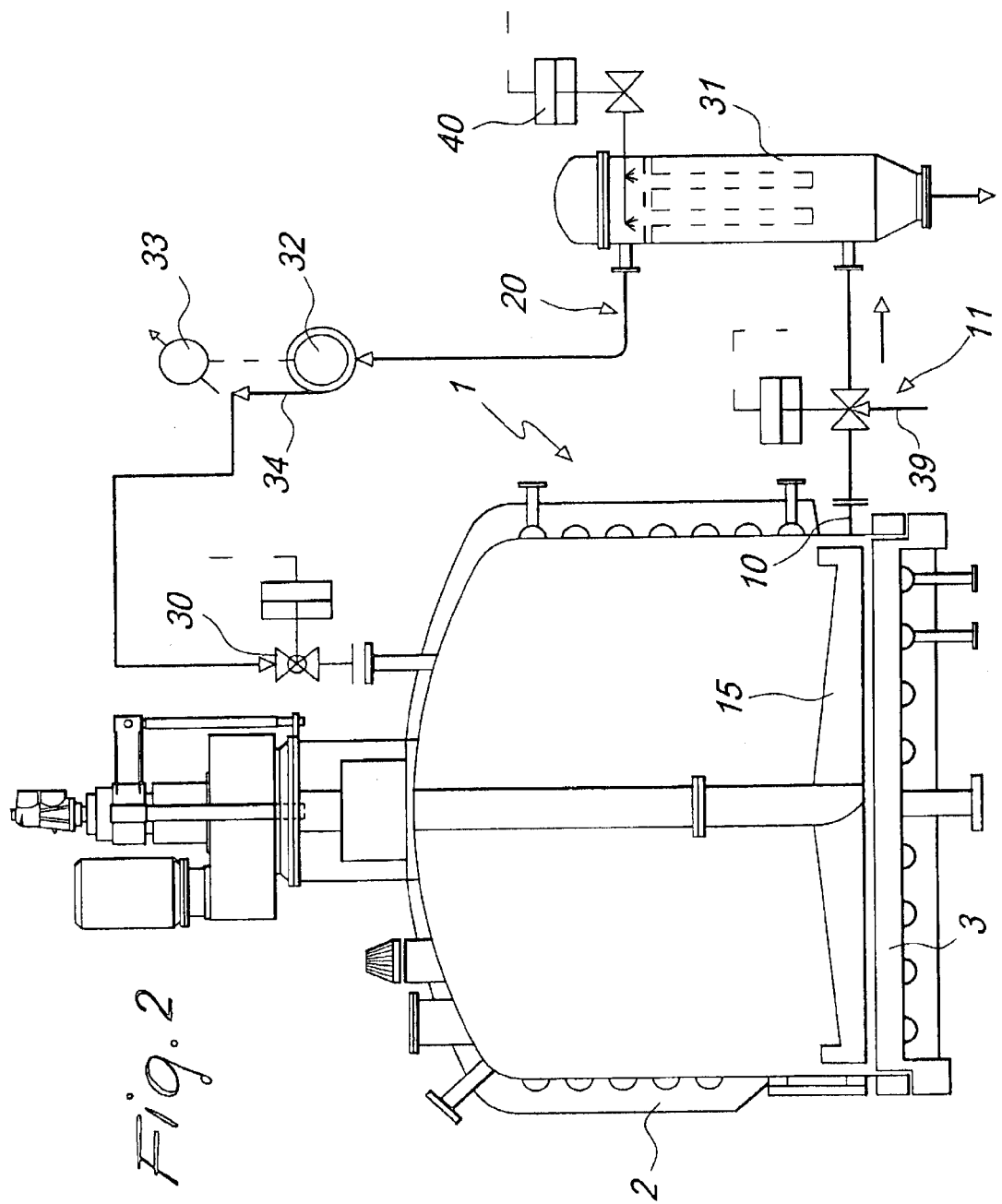
FIG. 2 is a schematic view of a drying filter to which a closed loop dried product discharge system according to the invention is applied.

For this purpose there is an inlet valve 30 for introducing the gaseous conveyance fluid in the container, and downstream of the discharge valve 10 there is a bag filter 31 on which an electric fan 32 and/or compressor, identified by the same symbol and by the same reference number in the schematic drawings of FIGS. 1 and 2, acts which is driven by a motor 33, in order to send the fluid toward a recovery duct 34 that optionally can be connected back to the inlet valve 30.

The incoming gaseous fluid for conveying the product can be introduced in a combined and/or selected manner from above, from below, tangentially from the bottom or optionally directly from the filtering wall in the case of vertical drying units or drying filters.

Similar results can be obtained by providing and using only a vacuum environment to evacuate the product moved by the agitator 15.

The fluid pressure can also be introduced or provided simply from below under the filtering wall or mesh 4, or optionally it is possible to apply pressure from below and from above simultaneously.

Generally, therefore, a system and method are provided which, by producing a pneumatic conveyance for discharging the dried product, allows to simplify considerably the structure, since it allows to eliminate the conventional hatch that is the source of many problems.

Furthermore, in order to provide enhanced fluid flowing of the product, downstream of the discharge valve 11 it is possible to inject a conveyance fluid 39 such as a pressurized gas, which produces a Venturi effect that facilitates conveyance.

Figure 3:
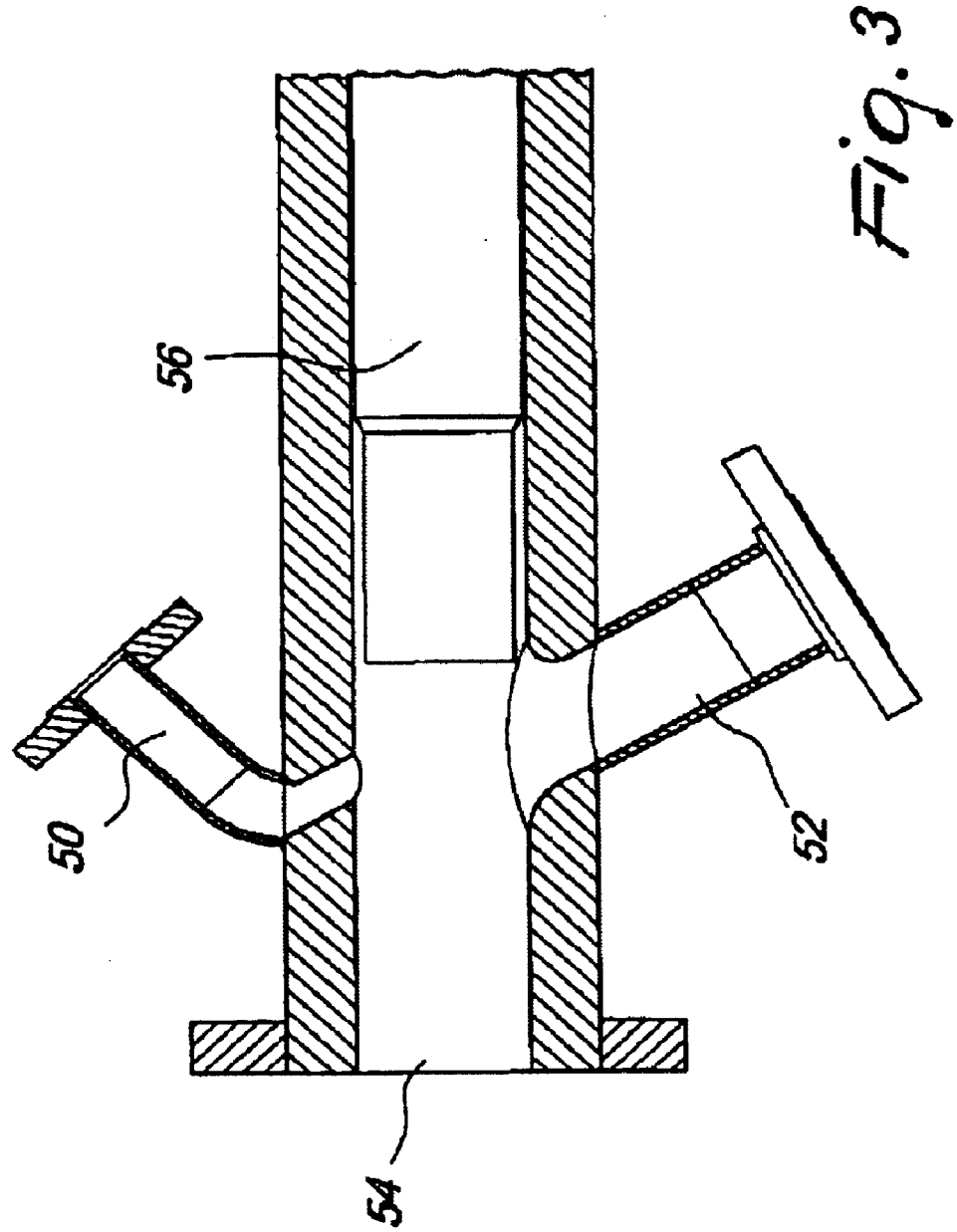
FIG. 3 is a schematic view of a valve arrangement providing a Venturi effect.

An example of a Venturi arrangement is given in FIG. 3, which shows an inlet 54 for the intake of dried product, an inlet 50 for the injection of a gaseous substance and an outlet 52 for the collection of dried product. The Venturi is produced by the movement of the piston 56, when it retracts to the position shown in the figure.

It should be added to the above that at the bag filter it is optionally possible to provide a backwashing inlet 40, functioning whereof being advantageously time-controlled so as to optimize the production cycle.

From the above description it is thus evident that the invention achieves the intended aim and objects, and in particular the fact is stressed that also a pneumatic conveyance method is provided in a way and with steps described above that is assuredly innovative for pneumatic conveyance and also according to a conceptual solution that is different from conventional pneumatic conveyances that use a star-type dosage valve, which in the present situation is useless if not a hindrance, since it might cause stagnation or damage to the product.

The invention thus conceived is susceptible of numerous modifications and variations, all of which are within the scope of the appended claims.

All the details may further be replaced with other technically equivalent elements.

In practice, the materials used, as well as the contingent shapes and dimensions, may be any according to requirements.

The disclosures in Italian Patent Application No. MI2001A001352 from which this application claims priority are incorporated herein by reference.

What is claimed is:

1. A system for discharging dried product from a container for treating and containing a dried product, comprising: a discharge hole provided at the container; a pneumatic circuit in communication with said discharge hole to produce a circulation of fluid in output from the container through the discharge hole; an agitator provided in said container to act on said dried product; a discharge valve that is interposed on said pneumatic circuit to control fluid flow through said discharge hole; an inlet valve provided on said container for conveyance fluid; a bag filter, provided downstream of said discharge valve; an electric fan and a compressor acting on said filter for fluid flow enabling; a recovery duct connecting said fan and compressor to said inlet valve; and a motor for driving said fan and compressor to convey the conveyance fluid toward said recovery duct.

2. The discharge system of claim 1, comprising pressurized conveyance fluid introduced in said container for achieving pneumatic circulation of the dried product.

3. The discharge system of claim 1, comprising a vacuum environment provided downstream of said discharge valve to achieve pneumatic circulation of said dried product.

4. The discharge system of claim 1, comprising a combination of a pressurized conveyance fluid introduced in the container and a vacuum environment produced downstream of said discharge valve to achieve pneumatic circulation.

5. The discharge system of claim 1, comprising an inlet for injecting a conveyance fluid in said pneumatic circuit downstream of said discharge valve, so as to provide an aspiration effect.

6. The discharge system of claim 5, wherein said conveyance fluid is constituted by an inert gaseous substance.

* * * * *